Patented Oct. 30, 1945

2,387,794

UNITED STATES PATENT OFFICE 2,387,794

PREPARATION OF p-CYMENE FROM A MONOCYCLIC TERPENE

Washington Hull, Noroton Heights, Conn., assignor to American Cyanamid Company, New York, N. Y., a corporation of Maine No Drawing. Original application January 9, 1943, Serial No. 471,878. Divided and this application December 11, 1943, Serial No. 513,991

2 Claims. (Cl. 260—668)

This invention relates to the catalytic dehydrogenation of terpenes. More particularly, the invention relates to the production of para-cymene by the vapor phase dehydrogenation of such monocyclic terpenes as dipentene, limonene, terpinolene, terpinenes and the like in the presence of a suitable catalyst containing oxides of chromium and manganese. The present invention constitutes a division of the subject matter contained in my copending application Serial No. 471,878, filed January 9, 1943.

Due to the growing importance of cymene as an intermediate in the production of such styrenes as methyl and α-4-dimethyl styrenes, and as an intermediate in the preparations of nitrogenous gasoline additives, increasing interest has been shown in its preparation from terpenes. The possibility of converting a monocyclic terpene such as dipentene to paracymene according to the theoretical equation

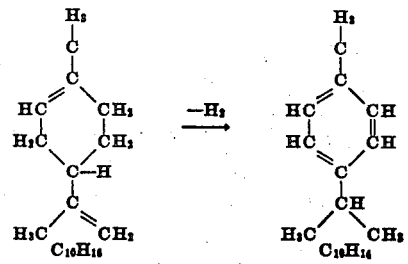

has long been considered as a method of obtaining the latter on a commercial scale. However, heating alone has proved to be inadequate to carry out the reaction. As a consequence, considerable work has been done in investigating catalytic methods for promoting the reaction.

Because of its adaptability to continuous production on a large scale, catalytic dehydrogenation in the vapor phase has received particular attention. Unfortunately, while the process is desirable from a procedural point of view, its practice has been subject to a number of drawbacks which in the past have prevented its commercial development.

The principal difficulty encountered in utilizing the process has been in the development of a suitable catalyst. The reaction has been carried out with some degree of success making use of such catalysts as fuller's-earth, kieselguhr, activated carbon and the like. The best results with these catalysts have been obtained by contacting the terpene with the catalyst at reaction temperatures of 100-200° C. in the liquid phase and from about 225-350° C. in the vapor phase. However, these catalysts are too inactive and the conversions obtained are too low to serve as a suitable basis for commercial development.

When attempts were made to use the higher operating temperatures with these catalysts, the final results were poor. While it might be generally supposed that the conversion to cymene could be improved by raising the reaction temperature, actually with most catalysts the extent to which cracking occurs is found to increase even more rapidly. An examination of the illustrative equation set forth above shows that the reaction is not simple. Not only is it necessary to remove hydrogen from some of the carbon molecules but it must also be added to others. Hence the reaction has sometimes been referred to as involving both dehydrogenation and hydrogenation.

The reaction is further complicated by the possibility of cracking both the original terpenes and the wholly or partially dehydrogenated reaction products. Therefore, it is not particularly surprising to find that raising the temperature with the catalysts proposed by the art actually reduced the cymene production whereas the production of such side reaction products as toluene, ethyl toluene, menthane and the like was increased. In some cases considerable isoprene is found. As a result, it was thought that temperatures above about 325° C. could not be safely used.

Nor did attempts to make use of more active types of dehydrogenation catalysts provide an acceptable solution to the difficulty. Metallic catalysts, such as nickel or copper for example, are too active. In order to prevent excessive cracking and tar formation they must be used at such low temperatures in producing para-cymene that the equilibrium conditions are unfavorable. Metallic catalysts of these types as well as the easily reducible metal oxides are particularly troublesome in that they tend to crack off the isopropyl group.

Many catalysts were found to produce a disproportionate yield of para-menthane. This latter is particularly unfortunate since once the production of para-menthane in appreciable quantities occurs, the equilibrium conditions are such that it is exceedingly difficult to completely dehydrogenate to cymene unless excessive contact times are employed. This latter is impractical since it tends to increase the losses of desirable products by increasing the amount of cracking which occurs.

Based on these experiences the art believed that it was necessary to find a catalyst which would not only give a good conversion without a disproportionate yield of para-menthane, but that it must also find a catalyst which would be operative at temperatures low enough to prevent cracking difficulties. One process, developed by research along these lines, is set forth in my U. S. Patent 2,272,711. In that case it was shown that by the use of a finely divided palladium metal catalyst on such surface active supports as activated carbon and alumina good results can be obtained. Excellent conversion of the terpene to a product remarkably free from such cycloaliphatic compounds as para-menthane were obtained using reaction temperatures of about 250-275° C.

These catalysts, while giving excellent results, are subject to a number of inherent drawbacks from the point of view of commercial development. The catalyst itself is, from an industrial point of view, relatively expensive to prepare. Further, since a number of materials tend to poison the catalyst, it is desirable to feed a material of high purity in order to prevent undue shortening of the active life of the metal catalyst. In addition, they can not be readily activated merely by heating in the presence of air, a procedure which is easily carried out and is desirable in a commercial process.

Where it is desirable to produce a product of particularly high purity, the palladium metal catalysts are highly superior. However, from the point of view of commercial production on a large scale, ease of preparation at low cost and ease of reactivation are such desirable properties in the catalyst to be used that they may often outweigh the added advantage of being able to produce a more nearly pure product without the necessity for further purification.

Consequently, there remains a demand for a process using a suitable catalyst which will give a good cymene yield, low in para-menthane content, and without an undue amount of cracking either of the material fed or of the intermediate products. At the same time, it is highly desirable that the catalyst be one which is relatively cheap to produce, has a long active life and can be readily reactivated. It is therefore an object of the present invention to develop such a group of catalysts and a process by which it can be utilized.

In general the objects of the present invention are accomplished by carrying out the dehydrogenation in the vapor phase using a catalyst comprising chromium oxide with or without the addition of one or more auxiliary oxides selected from the group comprising the oxides of manganese, supported on a non-pyrolytic carrier. Contrary to the teachings of the prior art it was found that it was not necessary to keep the reaction temperature below about 325° C. Not only is it unnecessary but wholly impractical to do so, since the reaction temperatures of 150-200° C. higher than the limits imposed by the prior art were found to give the best results. In this way conversions as high as 90% or better were obtained.

In evaluating the experimental results it is necessary to allow not only for the percent of the material which is converted to cymene, but also for the amount of material which is lost through cracking and other causes. For comparative purposes therefore, an arbitrary index was used. This index is one one-hundredth of the product of the percent of the feed recovered as condensate and the percent converted to cymene. For example, where 75% of the feed is recovered as condensate containing 80% cymene the index is $(75 \times 80)/100$ or 60. This enables a comparison of the results obtained when using different operating conditions and different catalysts to be made.

In carrying out the process of the present invention, the monocyclic terpenes which constitute the raw materials may be obtained from any suitable source. Dipentene, which is commercially available in acceptable quantities, was found to give excellent results. It may be obtained for example by isomerization of $\alpha$-pinene, which is in turn obtained from the sulfate turpentine produced as a by-product in the sulfate digestion of coniferous woods for the manufacture of paper pulp. The $\alpha$-pinene may be isomerized as a separate reaction either in the vapor or liquid phase, and the vapors of the resultant monocyclic terpenes passed directly over the catalyst of the present invention. It is not necessary that the monocyclic terpene be pure. Accordingly, the products obtained by the isomerization of $\alpha$-pinene for example may be used directly without fractionation.

Nor is the process of the present invention restricted to the use of a particular apparatus. The materials to be treated must be vaporized and the vapors passed over the catalyst mass in the reaction chamber at a temperature and rate dependent upon the amount of catalytic mass being used. The reaction products may be collected as by condensation and separated into their respective components as by fractional distillation. So long as these functions may be performed, the design and exact structure of the apparatus may be varied also at will. The development work was carried out using both glass and stainless steel reaction vessels. However, any material which is catalytically inactive, does not contaminate the materials and is resistant to intergranular attack by the hydrogen liberated during the reaction may be used.

Two controls were found to be of primary importance in carrying out the reaction successfully. These are the temperature at which the reaction is carried out and the rate at which the vapors are passed over the catalyst. While of the two the temperature is the least critical, both are important in obtaining satisfactory results. It was found that the optimum temperature varies with the nature of the feed, the amount of feed, the volume of catalyst and the like. Once the approximate optimum is determined, variations from this optimum of from 25-30° C. in either direction are not particularly objectionable, although the closer the control the better the results. Too low a temperature results in a poor production, due to the lowering of the reaction rate. Too high a temperature results in excessive cracking and tar formation. In general, temperatures of from about 425-500° C. were found to be satisfactory for a rate of feed within the ranges tested. The invention, however, is not meant to be so limited since in some cases temperatures as high as 525° C., or higher proved to be useful.

The rate of feed was found to have the most pronounced effect on the degree of conversion to the desired products. In general, a feed rate of from about 10 to 100 cc. per hour per 100 cc. of catalyst was found to give good results within the temperature ranges from 425-500° C., although the invention is not necessarily to be so limited.

Mixed chromium oxide and manganese oxide catalysts such as those of the present invention have a particular advantage, in addition to their being relatively inexpensive and easily prepared, in that they can be readily reactivated. Further they exhibit little, if any, decrease in catalytic activity after as many as thirty cycles. Regeneration is readily carried out by heating the mass while passing air over it. With some of the catalysts, particularly those containing oxides of tin, it is well to flush out the catalyst with hydrogen after the burning off. However, this is not absolutely necessary since acceptable results may be obtained without so doing.

The method of preparing the catalyst for use in the process of the present invention may be varied according to circumstances without departing from the scope of the present invention. Preferably it should be done under conditions which promote the lowest apparent density so as to create a large surface area. In this respect the catalysts of the present invention have an advantage over those set forth in my copending application Serial No. 471,877 filed January 9, 1943. In that case the oxide masses themselves were used as the catalyst. In so doing it is found that a large proportion of the catalyst mass was not available for the performing of useful work since it is substantially impossible to bring the reacting vapors into contact with all parts of the surface. The catalysts of the present process, being extended by the use of a non-pyrolytic carrier give a much larger volume of equally effective catalyst for the same weight of oxides since the surface area of the oxides is more efficiently utilized.

In addition to the advantage obtained by taking better advantage of the available surface area of the oxides, the catalysts of the present invention have other marked advantages in that they are generally easier to prepare. Further the materials used as supports are physically stronger than the oxide masses themselves so that the resultant mass is easier to handle both in the process of manufacturing the catalyst and in the conversion processes themselves. The supported catalysts exhibit less tendency to settle in the reaction chamber and thereby interfere with the free flow of vapors. They can withstand higher temperatures without physical damage than can the unsupported oxides, so that quicker and more efficient reactivation can be carried out by burning in air.

In preparing the catalyst so as to obtain the desired distribution of the oxides on the carrier and maintain the lowest bulk density any desirable procedure may be used. For example, a solution of the metal or metals in water may be used to impregnate the carrier mass after which it can be dried and the insoluble metal compound reduced to the corresponding oxide in situ. The carrier may be impregnated either by spraying on the carrier mass or by adding the carrier mass to the solution if the latter is sufficient in volume. Another procedure which can be used to obtain satisfactory results is to impregnate the carrier by using a suspension of the metals in their oxide form. This procedure is ordinarily used where it is difficult or the facilities are lacking to convert the metal compound to the oxide in place.

The physical form in which the finished catalyst occurs may also vary quite considerably. In some cases a support may be made into granules of a suitable size and the oxides deposited thereon. This is probably the easiest and cheapest method and is therefore preferable. However, in other cases it is difficult to obtain coherent granules of the carrier in sufficient quantity in the proper size range. This difficulty can be met in any one of several ways. The support may be powdered and made into pellets upon which the oxide mass is deposited for example, or the oxides may be mixed with the powder and the whole made into pellets.

Where difficulty in pelleting the material is caused either by the lack of self-adhesion or by the pellets being difficult to remove from the mold, a binder and/or a mold lubricant may be found useful. Substantially any combustible, wax-like material may be used for this purpose. Good results may be obtained using a material such as stearic acid in amounts of 1 to 2%. This material is an excellent mold lubricant and imparts the desired coherence to the particles. It is easily burned out after the pellets are placed in the converter. Where a permanent binder is necessary, water soluble silicates may be used. Pelleted material is particularly useful in that it enables a uniform packing of the reaction vessel.

A considerable variation in the nature and properties of the oxide which goes to make up the catalyst may also be made without departing from the scope of the present invention. The chromium oxide which is used in combination with the manganese oxide may be in either the three or six valent form. When used alone the trivalent form appears to give the better results. In admixture, either the three or the six valent form may give the better results depending principally on the makeup of the other oxides present and operating conditions. In many cases the presence of chromium, as an oxide, in both forms is helpful. In general the chromium oxide should be present in from about 1-3 mol parts for from 1-3 mol parts of the oxide or oxides of manganese.

The auxiliary oxides used in conjunction with the oxides of chromium may be varied considerably, both in composition and in amount. In developing the process of the present invention it was found that with the optimum conditions of feed rate and temperature, best results were obtained using from 1-3 mol parts of the oxides of manganese per part of chromium oxide. The invention, however, is not necessarily so limited. Useful results are obtained using proportions ranging from 1-3 mol parts of chromium oxide to about 1-3 parts of the auxiliary metal oxide.

Replacing all or part of the auxiliary metal oxide with an alkaline earth metal oxide such as barium or calcium usually has a slightly beneficial action on the production rate but decreases the yield of cymene by increasing the cracking rate. The presence of uncombined alkali metal oxides appears to be undesirable in that it prevents the proper "migration" of the hydrogen which must occur in cymene formation.

All of the catalysts of the present invention also have a marked advantage in that they may be used without the necessity for a diluent gas. Many dehydrogenation catalysts, useful for other purposes such for example as metallic nickel, are so active, at the temperatures at which the equilibrium is favorable to cymene production, that the time of contact must be controlled by means of a diluent. This is highly undesirable since it complicates both the process and apparatus and adds to the cost of operation. In most cases the catalysts of the present invention give better results in the absence of a diluent than they do when such a gas is used.

A number of non-pyrolytic materials are useful in making up the catalysts of the present invention. A number of these are the same materials which were used as catalysts in the earlier prior art. Notable among these are kieselguhr and aluminum oxide. The activated carbon catalyst used in the prior art is also a good material except that it can not be readily reactivated by burning. Among the more useful supports found were alumina and silica gels, such as the ordinary activated alumina of commerce and broken particles of silica bricks. Closely analogous to the latter, and also as good in use, are broken particles of burnt clay. The clays, however, should be as free as possible from alkaline metal oxides since these tend to promote excessive dehydrogenation and/or cracking. Another useful support is titanium dioxide although the latter suffers from the drawback that it must be powdered and pelleted to uniform size in order to serve as support for the other oxides.

Of the groups of materials tried and found useful, activated alumina is perhaps the most desirable since it is commercially available in forms ready for use, is relatively cheap and exhibits the least tendency among the supports tried to promote cracking. The invention, however, is not meant to be so limited since as pointed out good results were obtained using silica gel granules, broken burnt clay particles, titanium dioxide and kieselguhr as supports.

The invention will be more fully explained in connection with the following examples which are meant to be illustrative only and not by way of limitation.

In the following examples, the reaction products were analyzed to find the degree of conversion by passing dry HCl gas through 25 cc. samples of the condensate in an ice bath at the rate of about 2 bubbles per second for 1½ hours. The ice bath was then removed and the gas bubbled through at the same rate for 1 hour at room temperature. Free HCl was removed by evacuating at 10 mm. of mercury for ½ hour at room temperature. Approximately 2 gms. of the sample was then treated with 50 cc. of neutral methanol after which 50 cc. of standardized alcoholic KOH was added and the mixture refluxed for 2 hours. Since the unconverted terpenes form stable hydrochlorides whereas the desirable products do not, titration of the excess KOH after saponification gives a measure of the terpenes remaining in the condensate.

EXAMPLE 1

A solution of 52.6 gms. of $CrO_3$ in 500 cc. of water to which was added 10 cc. of concentrated sulfuric acid was prepared. $SO_2$ gas was bubbled through the solution at the rate of about 2 bubbles per minute until the chromium was reduced to the trivalent form. The solution was heated gently during the reduction step. When reduction was complete the solution was cooled and $Cr(OH)_3$ precipitated therefrom by adding slowly concentrated aqueous ammonia thereto until the solution became basic. The precipitate was collected and washed free from $SO_4^{--}$ ions on a suction filter and then dissolved in 105 cc. of concentrated nitric acid which had been diluted with 200 cc. of water. The resultant solution was sprayed onto 300 cc. of 6 to 10 mesh granules of burnt clay refuse while the mass was heated gently. 120 cc. of the resultant product was packed in an upright column and vaporized dipentene passed thereover at different temperatures and feed rates. Reaction products were collected by condensation and analyzed. Illustrative results are shown in Table I.

*Table I*

| Temp. (av.), °C. | Feed, cc./hr. | Av. conv., per cent | Index |
|---|---|---|---|
| 420 | 10 | 51.6 | 39.7 |
| 466 | 20 | 54.3 | 41.2 |
| 470 | 15 | 65.4 | 48.8 |
| 448 | 15 | 73.7 | 54.6 |

EXAMPLE 2

To a solution of 11.2 gms. of $MnCO_3$ in concentrated hydrochloric acid was added 20 cc. of concentrated nitric acid after which the mixture was evaporated with stirring to remove $Cl_2$ and HCl. The resultant $Mn(NO_3)_2$ was added to 360 cc. of a solution of $Cr(NO_3)_3$ prepared according to the procedure set forth in Example 1, containing 0.0836 gm. of $Cr_2O_3$ per cc. The resultant solution was sprayed onto 300 cc. of heated 6 to 10 mesh burnt clay refuse. 100 cc. of the impregnated and dried material was used in carrying out a number of runs by passing vaporized dipentene thereover as in Example 1. Illustrative results are shown in Table II.

*Table II*

| Temp. (av.), °C. | Feed, cc./hr. | Av. conv., per cent | Index |
|---|---|---|---|
| 415 | 10 | 56.7 | 40.6 |
| 449 | 15 | 62.5 | 46.0 |
| 449 | 20 | 71.0 | 56.6 |
| 459 | 20 | 68.1 | 53.8 |

EXAMPLE 3

369 gms. of $Cr(NO_3)_3 \cdot 9H_2O$ were dissolved in water. To one-half of this solution was added an $Mn(NO_3)_2$ solution containing 9.5 gms. of $MnO_2$ prepared as in Example 2. The combined solution was used to impregnate 300 cc. of 6 to 10 mesh granules of silica gel. 100 cc. of the catalyst was packed in a vertical reaction column and vaporized dipentene passed thereover at different feed rates and temperatures. Illustrative results obtained by analysis of the condensate are shown in Table III.

*Table III*

| Temp. (av.), °C. | Feed, cc./hr. | Av. conv., per cent | Index |
|---|---|---|---|
| 388 | 10 | 59.5 | 41.1 |
| 425 | 10 | 66.5 | 34.4 |
| 470 | 10 | 77.5 | 38.3 |
| 473 | 30 | 71.8 | 63.2 |

I claim:

1. A process of producing p-cymene which comprises the steps of maintaining a catalyst body at a temperature of from about 375°–500° C., completely vaporizing a monocyclic terpene having a single isopropyl side chain at a rate of from 0.1–1.0 part of liquid terpene per part of catalyst by volume, passing the completely vaporized terpene over the heated catalyst, whereby a major portion of the terpene is converted to p-cymene, condensing the condensable portion of the reaction vapors and isolating the p-cymene content therefrom; said catalyst body comprising 1–3 mol parts of a substance selected from the group consisting of $Cr_2O_3$, $CrO_3$ and mixtures of the same, together with from 1 to 3 mol parts of manganese oxide, supported on a carrier having a high surface activity by exhibiting substantially no tendency to crack off the isopropyl side chain at an operating temperature.

2. A process according to claim 1 characterized in that the carrier constitutes about 6 to 10 mesh "activated alumina."

WASHINGTON HULL.